(No Model.)

T. B. JEFFERY.
SEAT FOR VELOCIPEDES.

No. 384,980. Patented June 26, 1888.

Witnesses:
Cora L. Cadwallader.
Francis W. Parker.

Inventor:
Thomas B. Jeffery.
By Buxton and Buxton
his Attorneys

UNITED STATES PATENT OFFICE.

THOMAS B. JEFFERY, OF RAVENSWOOD, ILLINOIS.

SEAT FOR VELOCIPEDES.

SPECIFICATION forming part of Letters Patent No. 384,980, dated June 26, 1888.

Application filed April 18, 1887. Serial No. 235,153. (No model.)

*To all whom it may concern:*

Be it known that I, THOMAS B. JEFFERY, a citizen of the United States, residing at Ravenswood, in the county of Cook and State of Illinois, have invented certain new and useful Improvements in Velocipedes, which are fully set forth in the following specification, reference being had to the accompanying drawings, forming part thereof.

Figure 1:
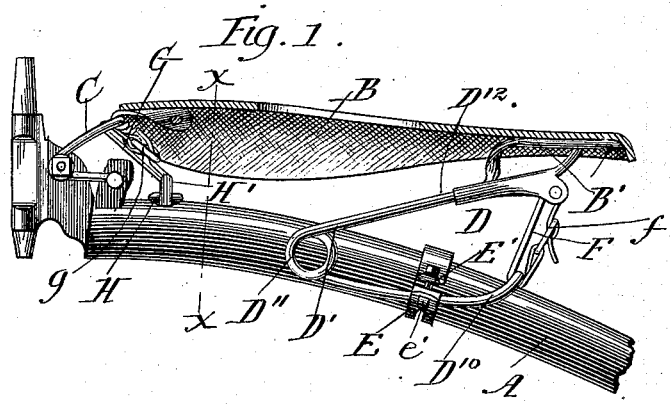
Figure 2:
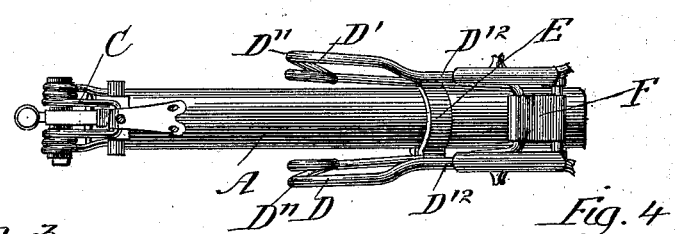
Figure 3:
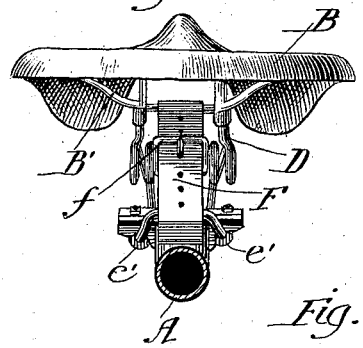
Figure 4:
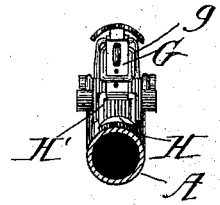
Figure 5:
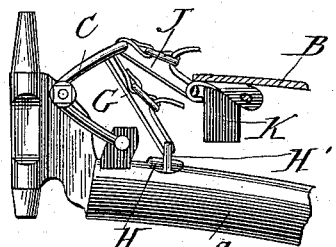
Figure 6:
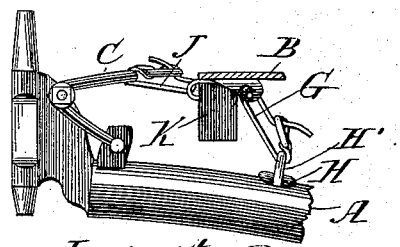

Figure 1 is a side elevation. Fig. 2 is a plan. Fig. 3 is a rear elevation. Fig. 4 is a section through $x\,x$, Fig. 1. Fig. 5 is a detail side elevation of a modified form of the front support and adjustments of the saddle. Fig. 6 is a similar detail showing a still further modification in the same parts.

A is the back-bone.

B is the seat, which, as illustrated, is flexile, being made of leather or like slightly elastic and flexible material. The seat is suspended at both ends upon springs. The front support is of the character shown and claimed in my application No. 220,686, filed December 4, 1886, and its said construction is not herein claimed. The spring C, constituting said forward support, is secured to the backbone and extends rearward and upward to its securement to the forward end of the seat B. Its rear end, to which the seat is connected, tends to yield downward and rearward under the rider's weight, and reacts elastically upward and forward.

D is the rear seat-support. It is also a spring, and is secured to the rear part of the seat B by means of the rear seat-frame, B', over which the leather is stretched and to which it is fastened, the spring-support D being in turn fastened to the forward lower part of said frame. Said spring is preferably formed, as illustrated, of heavy wire, which is bent to form two precisely-similar wings, D', which comprise each the part $D^{10}$, extending from the loop or bend which connects the wings and crosses the backbone, the spiral coil $D^{11}$, and the terminal part $D^{12}$, which is fastened to the frame B'. The entire spring-support D is secured to the backbone by means of the clamp E, whose bolts E' E' have hooked ends $e'\,e'$, which constitute also their heads, and which receive the part $D^{10}$ of the wings D' of the support D.

The spring support D tends to react upward against the weight of the rider on the seat, and the seat is held down by the strap F, which ties it to the backbone, the connection being most conveniently made by providing in the frame B' a suitable aperture to receive the strap, and passing said strap also around the rear loop of the spring-support D, where it crosses the backbone, said spring-support being securely clamped to the backbone, as described. This connection is equivalent to fastening the strap directly to the backbone. The rear end of the forward spring-support, C, is also tied down to the backbone in a similar manner by the strap G, which passes through a suitable eye in the rear end of the spring and through a staple, H', formed on the clip H, which encircles the backbone.

Both the straps F and G are provided with buckles $f$ and $g$, respectively, so that the distance to which the spring can react from the backbone may be adjusted as desired.

It should be noticed that the spring-support D is adapted to operate as a link or lever, whose pivot is at the center of the coil $D^{11}$ or at the point of flexure, and that that point being located forward of and lower than the rear end of the flexile seat B the yielding of said support tends to stretch the flexile seat or take up the slack which the weight of the rider tends to cause. A construction having the same effect is shown in my patent, No. 354,907, dated December 28, 1886, and I do not intend to claim that construction, broadly, herein; but, so far as I am aware, the spring has never before been located about such pivotal point or point of flexure, but has been located at the rear of the seat; and a peculiar advantage of the herein-described construction, as distinguished from former structures, is that the space in rear of the seat is left wholly clear, so that parcel-carrying fixtures are easily attached without awkwardly incumbering the vehicle; but the chief peculiarity of this construction is that, whereas the reaction of the rear spring tends to slack and not to stretch the flexile seat B, the strap F, which is functionally a link connecting the seat to the backbone, affords a means for limiting the reaction of the spring and stretching the seat to any desired tension. It will be noticed, further, that since the rear end or loop of the spring-support D is utilized as the means of securing the lower end of the strap F to the backbone, and since the entire support D is adjustable back and forward in the clamp E, and such adjustment rearward stretches the flexile seat B, the tension of the seat may be effected and regulated without recourse to the strap F; and since the adjustment by means of said strap effects also the height of the seat and may be used solely for that purpose, when this is desired, the entire support D, with the strap F, may be adjusted in the clamp E to compensate for the change of tension, which would otherwise be effected by the adjustment of the strap F, so that any height of seat within the limits of variability of the device may be obtained with any desired tension, the two adjustments thus co-operating to affect and mutually correct each other. The strap G, attaching the forward spring, C, to the backbone, operates in a precisely similar manner to effect adjustment of the height of the saddle at the forward end, and any change of tension of the flexile seat B which may incidentally be caused by such adjustment of the strap G may, if desired, be corrected by adjusting the rear support, D, in the clamp E, or by adjusting the rear strap, F, or by both said adjustments.

It will be further noticed that the movement of the supports C and D in yielding to the weight of the rider is rearward as well as downward, as has already been pointed out, and by reason of the angle at which said springs extend from their points of flexure or pivotal points, respectively, said movement is even more rearward than downward. This causes the action of the saddle to be very easy, relieving it of the severely jolting movement which results from a mode of support which compels all the movement to be up and down. The fact that both supports move rearward, as described, does not prevent the seat from being stretched by the yielding of the rear support, because the rear support, D, is so much longer than the front support, C, and therefore moves farther rearward than does the front support when both yield under the weight of the rider.

It will be obvious that this construction may be applied elsewhere than in a velocipede, the backbone being merely the saddle-tree, and the entire structure, except in minor details, being applicable to a riding-saddle or seat for other vehicles besides velocipedes, and I do not, therefore, limit myself to its use in a velocipede, but design the term "backbone" as used herein to refer to any saddle-tree. It will be further apparent that so far as the straps F and G serve simply to check the upward action of the spring-supports of the seats they will be equally as serviceable in connection with a rigid or non-flexile seat as in the construction herein shown. It will be further apparent that the rearward action of the spring-supports in yielding under the rider's weight, and the consequent easy movement of the seat as distinguished from the jolting movement which results from a direct vertical action, is independent of the character of the seat, whether flexile or non-flexile.

It is often desirable to be able to adjust the seat farther forward and farther back on the backbone or tree, and for that purpose I sometimes construct the forward spring-support, as seen in Figs. 5 and 6, so that it may be connected to the forward end of the seat by an adjustable link, J, the form of which is, by preference, a strap and buckle, which permits the forward end of the seat to be drawn up close to the rear end of the spring C or let back a considerable distance. The rear support, as already explained, can be adjusted on the backbone. In order that the interposition of this link may not cause the forward end of the seat to be too unsteady, I attach to the clip which effects securement of the seat to the link a rubber block, K, which partly fills the space below the forward end of the seat down to the backbone and acts as a buffer or stop. It does not, however, prevent the adjustment of the spring-support C by means of the strap-link or check-strap G, as hereinabove described. The position of the seat may be adjusted without changing the length of the strap or link J by merely allowing it to droop from its connection with the spring-support C when the seat is to be set forward, and drawing it up horizontal when the seat is to be set back. The change of height of the seat thus incidentally effected may then be partly corrected by adjusting the check-strap G, and when that construction and mode of use is to be adopted I prefer to connect the check-strap G directly to the forward end of the seat, as shown in Fig. 6, rather than to the rear end of the spring C. When thus constructed, it will be seen that the link J and check-strap G together constitute the adjustable link from the rear end of the spring C down to the backbone, so that the principle and action of the device is not materially changed.

I claim—

1. In combination with the backbone or saddle-tree, the seat and supports for the same on the tree at the front and rear ends, both supports being adapted to yield elastically rearward, and check straps or links to limit their reaction upward, substantially as set forth.

2. In combination with the backbone or saddle-tree, the seat, a spring-support for its forward end, a link connecting the seat to such spring-support, a check-strap adjustable in length which ties the end of the spring downward to the backbone, and a rear support for the seat adjustable back and forward, substantially as set forth.

3. In combination with the backbone or tree and a flexile seat, supports for both ends of the seat secured upon the tree, the front support pivoted forward of the seat and extending rearward and upward, the rear support wholly under the seat and having its pivotal point forward of the center of the seat, whereby weight upon the seat causes both springs to yield elastically rearward, substantially as and for the purpose set forth.

4. In combination with the backbone or saddle-tree, a flexile seat, a support on the tree forward of the seat for the forward end of the seat, a support on the tree for the rear end of the seat, wholly under the seat and having its pivotal point forward of the center of the seat, thereby yielding elastically downward and rearward, the said rear support being adjustable back and forward on the tree, whereby the tension of the seat and its height from the tree are made adjustable each with or without change of the other, substantially as set forth.

5. In combination with the backbone or saddle-tree, a flexile seat, a support on the tree for the forward end of the seat, a support on the tree for the rear end of the seat, yielding elastically downward and rearward, and a link adjustable in length connecting the rear end of such rear support down to the tree, the said rear support being adjustable back and forward on the tree, whereby the tension of the seat and its height from the tree are made adjustable each with or without change of the other, substantially as set forth.

6. In combination with the backbone or saddle-tree, the rear seat-support, D, comprising the portions $D^{10}$ and $D^{12}$ and the connecting coil-spring portion $D^{11}$ at the forward part, the part $D^{10}$ being adjustably secured to the tree and the part $D^{12}$ being fixedly secured to the seat, and the adjusting-strap F, connecting the rear of the part $D^{10}$ to the rear part of the seat, substantially as set forth.

7. In combination, substantially as set forth, the backbone or saddle-tree, the seat, the rear spring-support for the seat, and the adjusting or check strap, the spring-support having its spring flexure at the front and having its lower branches, $D^{10}$, united rearward of the securement to the backbone and forming a bend above the same, whereby said bend serves as a loop or staple in which to secure the adjusting or check strap to the backbone.

8. In combination with the backbone or tree, a flexile seat, a support on the tree for the forward end of the seat yielding elastically downward and rearward, and a check and adjusting strap, as G, connecting the spring-support down to the tree, and a support for the rear end of the seat secured to the tree and adjustable back and forward thereon, substantially as set forth.

9. In combination with the backbone or saddle-tree and a flexile seat, spring-supports for the seat secured upon the tree and extending rearward and upward to their connection with the seat, whereby they tend to yield rearward and downward, the rear support being longer than the forward support, whereby the seat in yielding toward the rear on both its spring-supports is also stretched to take up the slack caused by the rider's weight, substantially as set forth.

In testimony whereof I have hereunto set my hand, in the presence of two witnesses, at Chicago, Illinois, this 15th day of April, A. D. 1887.

THOS. B. JEFFERY.

Attest:
CHAS. S. BURTON,
E F. BURTON.